(12) United States Patent
Chen et al.

(10) Patent No.: US 8,204,274 B2
(45) Date of Patent: Jun. 19, 2012

(54) METHOD AND SYSTEM FOR TRACKING POSITIONS OF HUMAN EXTREMITIES

(75) Inventors: Po-Lung Chen, Taipei (TW); Chien-Chun Kuo, Guanmiao Township (TW); Ko-Shyang Wang, Kaohsiung (TW)

(73) Assignee: Industrial Technology Research Institute (TW)

( * ) Notice: Subject to any disclaimer, the term of this patent is extended or adjusted under 35 U.S.C. 154(b) by 705 days.

(21) Appl. No.: 12/371,487

(22) Filed: Feb. 13, 2009

(65) Prior Publication Data

US 2010/0014710 A1 Jan. 21, 2010

(30) Foreign Application Priority Data

Jul. 21, 2008 (TW) ................ 97127597 A

(51) Int. Cl.
*G06K 9/00* (2006.01)
(52) U.S. Cl. ........ 382/103; 348/169
(58) Field of Classification Search .......... 382/100, 382/103, 106, 107, 115–118, 154, 181, 190, 382/195, 206; 348/143, 169–172; 345/419–427; 356/12
See application file for complete search history.

(56) References Cited

U.S. PATENT DOCUMENTS

| | | | | |
|---|---|---|---|---|
| 5,629,752 A | * | 5/1997 | Kinjo | 355/35 |
| 6,208,758 B1 | * | 3/2001 | Ono et al. | 382/190 |
| 6,498,628 B2 | * | 12/2002 | Iwamura | 348/734 |
| 6,928,231 B2 | * | 8/2005 | Tajima | 386/241 |
| 7,227,526 B2 | | 6/2007 | Hildreth et al. | |
| 2001/0031129 A1 | * | 10/2001 | Tajima | 386/46 |
| 2002/0057383 A1 | | 5/2002 | Iwamura | |
| 2010/0172567 A1 | * | 7/2010 | Prokoski | 382/132 |
| 2010/0220892 A1 | * | 9/2010 | Kawakubo | 382/103 |
| 2011/0080336 A1 | * | 4/2011 | Leyvand et al. | 345/156 |

FOREIGN PATENT DOCUMENTS

TW I262812 10/2006

OTHER PUBLICATIONS

Office Action issued on Mar. 14, 2012 in corresponding application No. TW 097127597.

* cited by examiner

*Primary Examiner* — Anand Bhatnagar
(74) *Attorney, Agent, or Firm* — Lowe Hauptman Ham & Berner, LLP

(57) ABSTRACT

A method for tracking positions of human extremities is disclosed. A left image of a first extremity portion is retrieved using a first picturing device and an outline candidate position of the first extremity portion is obtained according to feature information of the left image. A right image of the first extremity portion is retrieved using a second picturing device and a depth candidate position of the first extremity portion is obtained according to depth information of the right image. Geometry relations between the outline candidate position and the depth candidate position and a second extremity portion of a second extremity position are calculated to determine whether a current extremity position of the first extremity portion is required to be updated.

40 Claims, 2 Drawing Sheets

METHOD AND SYSTEM FOR TRACKING POSITIONS OF HUMAN EXTREMITIES

RELATED APPLICATIONS

The present application is based on, and claims priority from, Taiwan Application Number 97127597, filed Jul. 21, 2008, the disclosure of which is hereby incorporated by reference herein in its entirety.

BACKGROUND OF THE INVENTION

1. Field of the Invention

The invention relates to image tracking, and more particularly to a method and system for tracking positions of human extremities.

2. Description of the Related Art

Video recognition, analysis and tracking of human extremities, such as a face, or hands, are popularly applied technologies. However, conventional video recognition technologies focus on the entire portions of human extremities and not subtle changes in human extremities, such as finger operations, thus limiting applications thereof. Additionally, for interactive video recognition, partial motion detection and interaction is also based mainly upon entire portions of human extremities and not subtle movements, such as raising of only the right or left hand or kicking with only the right or left leg, among others.

Thus, a method and system for tracking positions of human extremities is desirable, wherein subtle changes in human extremities, such as with the hands and legs, can be effectively recognized and tracked, so that interactive applicability may be increased for greater applications, such as for game control, motion analysis, multimedia display, and other applications.

BRIEF SUMMARY OF THE INVENTION

Methods for tracking positions of human extremities are provided. An exemplary embodiment of a method for tracking positions of human extremities comprises the following.

A left image of a first extremity is retrieved using a first picturing device and an outline candidate position of the first extremity portion is obtained according to feature information of the left image. A right image of the first extremity portion is retrieved using a second picturing device and a depth candidate position of the first extremity portion is obtained according to depth information of the right image. The geometric relationships between the outline candidate position and the depth candidate position and a second extremity position of a second extremity portion are calculated to determine whether a current extremity position of the first extremity portion is required to be updated.

Systems for tracking positions of human extremities are provided. An exemplary embodiment of a system for tracking positions of human extremities comprises a first picturing device, a second picturing device, and an operation device. The operation device retrieves a left image of a first extremity portion using the first picturing device, obtains an outline candidate position of the first extremity portion according to feature information of the left image, retrieves a right image of the first extremity portion using the second picturing device, obtains a depth candidate position of the first extremity portion according to depth information of the right image, calculates geometry relations between the outline candidate position and the depth candidate position and a second extremity position of a second extremity portion, and determines whether a current extremity position of the first extremity portion is required to be updated.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
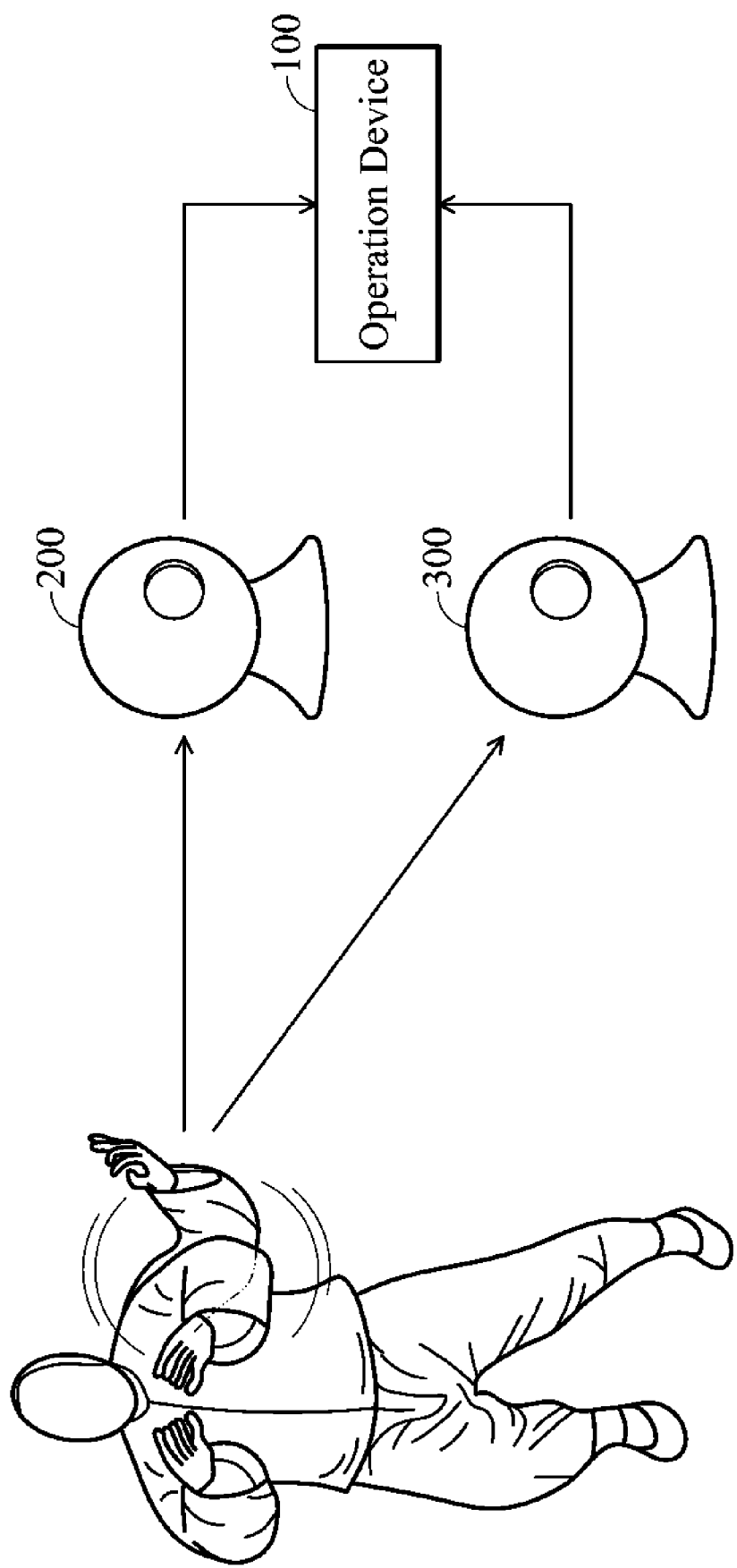
FIG. 1 is a schematic view of a system for tracking positions of human extremities of the present invention.

Several exemplary embodiments of the invention are described with reference to FIGS. 1 through 2, which generally relate to tracking positions of human extremities. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system for tracking positions of human extremities.

An embodiment of a method and system for tracking positions of human extremities extracts successive images of an extremity using two picturing devices and determines and tracks positions of extremities according to feature regions of the extracted images and depth information resulting from phase differences between the extracted images.

FIG. 1 is a schematic view of a system for tracking positions of human extremities of the present invention.

An exemplary embodiment of a system for tracking positions of human extremities comprises an operation device 100 and picturing devices 200 and 300. Left and right images of a figure are respectively extracted using the picturing devices 200 and 300 and are transmitted to the operation device 100 for determining and tracking extremities. The process is described with reference to the flowchart in FIG. 2.

Figure 2:
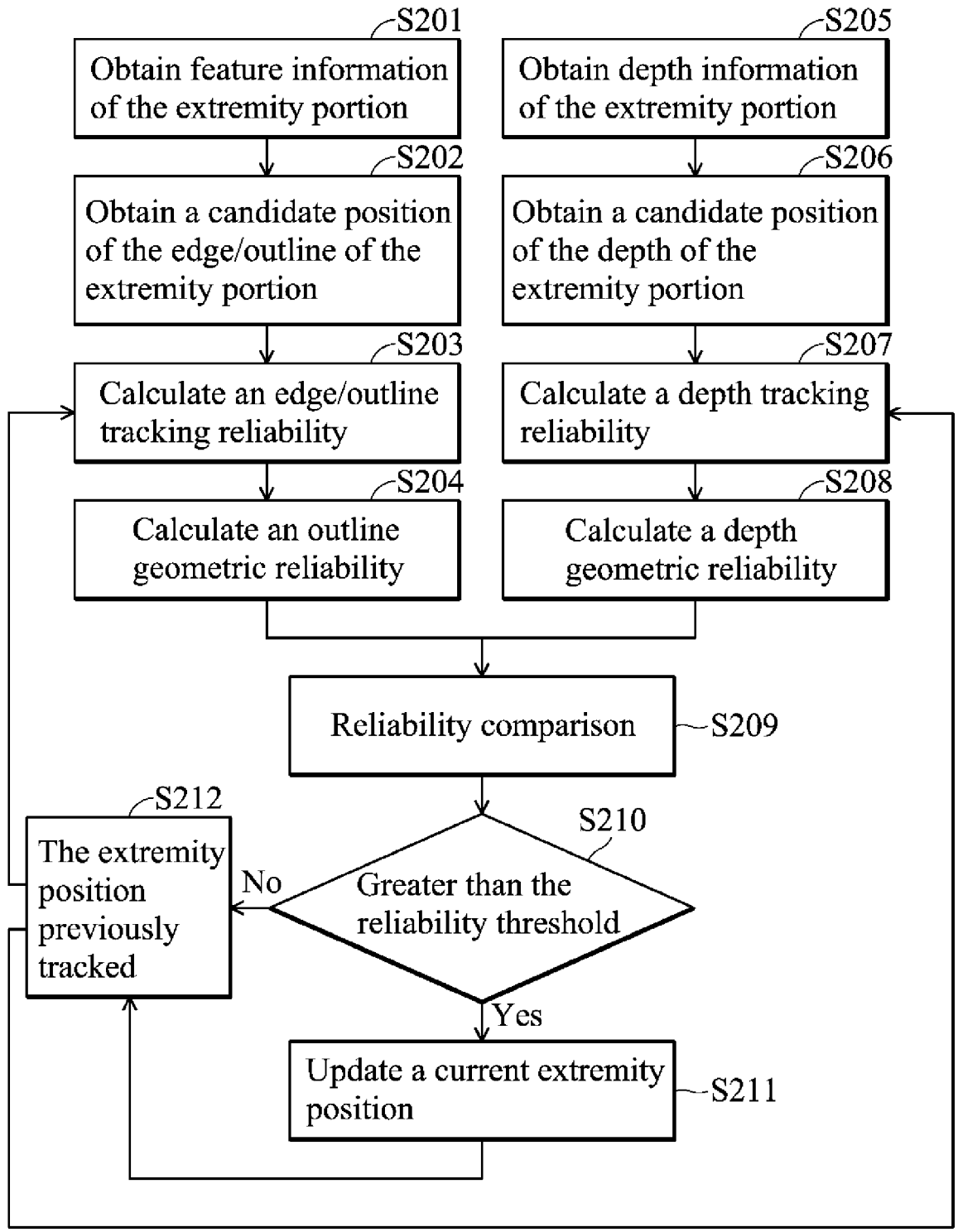
FIG. 2 is a flowchart of a method for tracking positions of human extremities of the present invention.

FIG. 2 is a flowchart of a method for tracking positions of human extremities of the present invention.

The operation device 100 retrieves a left image of an extremity portion (for example, the left hand, i.e. the first extremity portion) using the first picturing device, and implements removal of background and edge/outline of the left image to obtain feature information of the first extremity portion (step S201). The operation device 100 obtains a candidate position of the edge/outline of the first extremity portion (named an outline candidate position) according to the feature information of the first extremity position (step S202), and, based on a extremity position previously tracked of the extremity portion (step S212), calculates a distance (first distance) between the outline candidate position obtained from the step S202 and the first extremity position, and then calculating an edge/outline tracking reliability (named outline tracking reliability) of the first extremity portion (step S203). The outline tracking reliability is inversed to the distance, which is greater if closer.

The operation device 100 calculates geometric reliability of the outline candidate position (named outline geometric reliability) according to a central axis or the body or the head (i.e. a second extremity portion) (step S204). The outline geometric reliability is greater when the outline candidate position is furthest from the central axis or the head, or is less, but not linear thereto. Additionally, an occupied region of the first extremity can be calculated according to feature information of the extremity portion. When the first extremity portion exceeds the occupied region by a predetermined distance, the geometric reliability is greater and when the first extremity is closer to or resides in the occupied region, the geometric reliability is lesser, The operation device 100 retrieves a right image of the extremity portion (for example, the right hand) using the picturing device 300 and calculates depth information of the extremity portion according to the left and right images (step S205). The operation device 100 obtains a depth candidate position of the extremity portion according to depth information of the right image (step S206) and, based on the extremity position previously tracked of the extremity portion (step S212), calculates a distance between the outline candidate position obtained from the step S202 and the extremity position previously tracked of the extremity portion, and then calculating the depth tracking reliability of the extremity portion (step S207).

The operation device 100 calculates geometric reliability of the depth candidate position (named depth candidate reliability) of the central axis of the body or the head (step S208). The operation device 100 compares the outline tracking reliability with the depth tracking reliability and compares the outline geometric reliability with the depth geometric reliability to select one of the depth/outline tracking reliability or the depth/outline geometric reliability with the greatest reliability (step S209). The operation device 100 compares the selected greater reliability with a predefined depth/outline reliability depth/outline reliability threshold to determine whether the selected greater reliability is greater than the depth/outline reliability threshold (step S210).

If the selected greater reliability is greater than the reliability depth/outline reliability threshold, a candidate position corresponding to the selected greater reliability is updated by a current extremity position of the extremity portion (step S211). If the selected greater reliability is not greater than the reliability depth/outline reliability threshold, indicating that the tracking is invalid, the extremity position previously tracked is served as the current extremity position of the extremity portion (step S212).

It is noted that the first extremity portion is the head, hand, leg, elbow, finger, or other extremity portions, or a mark on one of the described extremity portions.

It is noted that a first extremity position of the first extremity portion, the outline candidate position, the depth candidate position, or second extremity position of the second extremity portion is a two-dimensional image and is represented by image coordinates or image blocks.

It is noted that the method further utilizes an angle or corner of the outline or edge of the first extremity portion as the outline candidate position.

It is noted that the method further calculates the depth information according to differences between two images of the first extremity portion.

It is noted that the method further calculates the depth information according to differences between partial regions of the two images of the first extremity portion.

It is noted that the method further calculates the depth information using a 3D reconstruction method.

It is noted that the second extremity portion is the head, face, neck, central point of the body, central axis of the body, waist, crossed-leg, or other extremity portions for reference, or a mark on one of the described extremity portions.

It is noted that the geometric relationships comprise calculating a distance between the outline candidate position and the second extremity position of the second extremity portion.

It is noted that the geometric relationships comprise calculating a distance between the outline candidate position and the second extremity position of the second extremity portion or between the depth candidate position and the second extremity position of the second extremity portion.

It is noted that the geometric relationships comprise increasing probability of updating a first extremity position of the first extremity portion to a closer distance when the outline candidate position or the depth candidate position is closer to the second extremity position of the second extremity portion.

It is noted that the geometric relationships comprise increasing probability of updating a first extremity position of the first extremity portion by the outline candidate position when the outline candidate position is furthest from the position T, or decreasing probability when closest to the position T.

It is noted that the geometric relationships comprise increasing probability of updating a first extremity position of the first extremity portion by the outline candidate position when difference between coordinates of the outline candidate position residing in a specific axis and that of the second extremity position of the second extremity portion residing in the specific axis is greater, or decreasing the probability when less.

It is noted that the geometric relationships comprise increasing probability of updating a first extremity position of the first extremity portion by the depth candidate position when difference between coordinates of the depth candidate position residing in a specific axis and that of the second extremity position of the second extremity portion residing in the specific axis is less, or decreasing the probability when greater It is noted that the method further determines whether a first extremity position of the first extremity portion is replaced by the outline candidate position or the depth candidate position.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for tracking positions of human extremities, comprising:
retrieving a left image of a first extremity portion using a first picturing device;
obtaining an outline candidate position of the first extremity portion according to feature information of the left image;
retrieving a right image of the first extremity portion using a second picturing device;
obtaining a depth candidate position of the first extremity portion according to depth information of the right image;
calculating geometry relations between the outline candidate position and the depth candidate position and a second extremity position of a second extremity portion; and
determining whether a current extremity position of the first extremity portion is required to be updated.

2. The method for tracking positions of human extremities as claimed in claim 1, further comprising:
implementing a background and edge/outline removing to the left image to obtain feature information of the first extremity portion;
obtaining the outline candidate position of edge/outline of the first extremity portion according to the feature information of the first extremity position;
based on a extremity position previously tracked of the first extremity portion, calculating a first distance between the outline candidate position and the extremity position and then calculating outline tracking reliability of the first extremity portion; and
calculating outline geometry reliability of the outline candidate position according to the second extremity position of the second extremity portion.

3. The method for tracking positions of human extremities as claimed in claim 2, further comprising:
calculating depth information of the first extremity portion according to the left and right images;
obtaining the depth candidate position of the first extremity portion according to the depth information of the right image;
based on the extremity position previously tracked of the first extremity portion, calculating a second distance between the depth candidate position and the extremity position and then calculating depth tracking reliability of the first extremity portion; and
calculating depth geometry reliability of the depth candidate position according to the second extremity position of the second extremity portion.

4. The method for tracking positions of human extremities as claimed in claim 3, further comprising:
comparing the outline tracking reliability with the depth tracking reliability and comparing the outline geometry reliability with the depth geometry reliability to select one of the reliability with greater reliability;
comparing the selected reliability with predefined reliability threshold to determine whether the selected reliability is greater than the reliability threshold;
if greater than the reliability threshold, updating a candidate position corresponding to the selected reliability by a current extremity position of the first extremity portion; and
if not greater than the reliability threshold, serving the extremity position previously tracked as the current extremity position of the first extremity portion.

5. The method for tracking positions of human extremities as claimed in claim 2, wherein the outline tracking reliability is inversive to the first distance.

6. The method for tracking positions of human extremities as claimed in claim 1, wherein the outline candidate position reliability is inversive but is not linear to the second extremity position of the second extremity portion.

7. The method for tracking positions of human extremities as claimed in claim 1, wherein the first extremity portion is the head, hand, leg, elbow, finger, or other extremity portions, or a mark on one of the described extremity portions.

8. The method for tracking positions of human extremities as claimed in claim 1, wherein a first extremity position of the first extremity portion, the outline candidate position, the depth candidate position, or the second extremity position of the second extremity portion is a two-dimensional image and is represented by image coordinates or image blocks.

9. The method for tracking positions of human extremities as claimed in claim 1, further comprising serving a turning point of the outline or edge of the first extremity portion as the outline candidate position.

10. The method for tracking positions of human extremities as claimed in claim 1, further comprising calculating the depth information according to difference between two images of the first extremity portion.

11. The method for tracking positions of human extremities as claimed in claim 1, further comprising calculating the depth information according to difference between partial regions of two images of the first extremity portion.

12. The method for tracking positions of human extremities as claimed in claim 1, further comprising calculating the depth information using a 3D reconstruction method.

13. The method for tracking positions of human extremities as claimed in claim 1, wherein second extremity portion is the head, face, neck, central point of the body, central axis of the body, waist, cross-leg, or other extremity portions for reference, or a mark on one of the described extremity portions.

14. The method for tracking positions of human extremities as claimed in claim 1, wherein the geometry relations comprise calculating a distance between the outline candidate position and the second extremity position of the second extremity portion.

15. The method for tracking positions of human extremities as claimed in claim 1, wherein the geometry relations comprise calculating a distance between the outline candidate position and the second extremity position of the second extremity portion or between the depth candidate position and the second extremity position of the second extremity portion.

16. The method for tracking positions of human extremities as claimed in claim 1, wherein the geometry relations comprise increasing probability of updating a first extremity position of the first extremity portion to a closer distance when the outline candidate position or the depth candidate position is closer to the second extremity position of the second extremity portion.

17. The method for tracking positions of human extremities as claimed in claim 1, wherein the geometry relations comprise increasing probability of updating a first extremity position of the first extremity portion by the outline candidate position when the outline candidate position is farther to position T, or decreasing the probability when closer to the position T.

18. The method for tracking positions of human extremities as claimed in claim 1, wherein the geometry relations comprise increasing probability of updating a first extremity position of the first extremity portion by the outline candidate position when difference between coordinates of the outline candidate position residing in a specific axis and that of the second extremity position of the second extremity portion residing in the specific axis is greater, or decreasing the probability when less.

19. The method for tracking positions of human extremities as claimed in claim 1, wherein the geometry relations comprise increasing probability of updating a first extremity position of the first extremity portion by the depth candidate position when difference between coordinates of the depth candidate position residing in a specific axis and that of the second extremity position of the second extremity portion residing in the specific axis is less, or decreasing the probability when greater.

20. The method for tracking positions of human extremities as claimed in claim 1, further comprising determining whether a first extremity position of the first extremity portion is replaced by the outline candidate position or the depth candidate position.

21. A system for tracking positions of human extremities, comprising:
a first picturing device;
a second picturing device; and
an operation device, retrieving a left image of a first extremity portion using the first picturing device, obtaining an outline candidate position of the first extremity portion according to feature information of the left image, retrieving a right image of the first extremity portion using the second picturing device, obtaining a depth candidate position of the first extremity portion according to depth information of the right image, calculating geometry relations between the outline candidate position and the depth candidate position and a second extremity position of a second extremity portion, and determining whether a current extremity position of the first extremity portion is required to be updated.

22. The system for tracking positions of human extremities as claimed in claim 21, wherein the operation device implements a background and edge/outline removing to the left image to obtain feature information of the first extremity portion, obtains the outline candidate position of edge/outline of the first extremity portion according to the feature information of the first extremity position, based on a extremity position previously tracked of the first extremity portion, calculates a first distance between the outline candidate position and the extremity position and then calculating outline tracking reliability of the first extremity portion, and calculates outline geometry reliability of the outline candidate position according to the second extremity position of the second extremity portion.

23. The system for tracking positions of human extremities as claimed in claim 22, wherein the operation device calculates depth information of the first extremity portion according to the left and right images, obtains the depth candidate position of the first extremity portion according to the depth information of the right image, based on the extremity position previously tracked of the first extremity portion, calculates a second distance between the depth candidate position and the extremity position and then calculating depth tracking reliability of the first extremity portion, and calculates depth geometry reliability of the depth candidate position according to the second extremity position of the second extremity portion.

24. The system for tracking positions of human extremities as claimed in claim 23, wherein the operation device compares the outline tracking reliability with the depth tracking reliability and compares the outline geometry reliability with the depth geometry reliability to select one of the reliability with greater reliability, compares the selected reliability with reliability threshold to determine whether the selected reliability is greater than the reliability threshold, if greater than the reliability threshold, updates a candidate position corresponding to the selected reliability by a current extremity position of the first extremity portion, and, if not greater than the reliability threshold, serves the extremity position previously tracked as the current extremity position of the first extremity portion.

25. The system for tracking positions of human extremities as claimed in claim 22, wherein the outline tracking reliability is inversive to the first distance.

26. The system for tracking positions of human extremities as claimed in claim 21, wherein the outline candidate position reliability is inversive but is not linear to the second extremity position of the second extremity portion.

27. The system for tracking positions of human extremities as claimed in claim 21, wherein the first extremity portion is the head, hand, leg, elbow, finger, or other extremity portions, or a mark on one of the described extremity portions.

28. The system for tracking positions of human extremities as claimed in claim 21, wherein a first extremity position of the first extremity portion, the outline candidate position, the depth candidate position, or the second extremity position of the second extremity portion is a two-dimensional image and is represented by image coordinates or image blocks.

29. The system for tracking positions of human extremities as claimed in claim 21, wherein the operation device serves a turning point of the outline or edge of the first extremity portion as the outline candidate position.

30. The system for tracking positions of human extremities as claimed in claim 21, wherein the operation device calculates the depth information according to difference between two images of the first extremity portion.

31. The system for tracking positions of human extremities as claimed in claim 21, wherein the operation device calculates the depth information according to difference between partial regions of two images of the first extremity portion.

32. The system for tracking positions of human extremities as claimed in claim 21, wherein the operation device calculates the depth information using a 3D reconstruction method.

33. The system for tracking positions of human extremities as claimed in claim 21, wherein second extremity portion is the head, face, neck, central point of the body, central axis of the body, waist, cross-leg, or other extremity portions for reference, or a mark on one of the described extremity portions.

34. The system for tracking positions of human extremities as claimed in claim 21, wherein the geometry relations comprise calculating a distance between the outline candidate position and the second extremity position of the second extremity portion.

35. The system for tracking positions of human extremities as claimed in claim 21, wherein the geometry relations comprise calculating a distance between the outline candidate position and the second extremity position of the second extremity portion or between the depth candidate position and the second extremity position of the second extremity portion.

36. The system for tracking positions of human extremities as claimed in claim 21, wherein the geometry relations comprise increasing probability of updating a first extremity position of the first extremity portion to a closer distance when the outline candidate position or the depth candidate position is closer to the second extremity position of the second extremity portion.

37. The system for tracking positions of human extremities as claimed in claim 21, wherein the geometry relations comprise increasing probability of updating a first extremity position of the first extremity portion by the outline candidate position when the outline candidate position is farther to position T, or decreasing the probability when closer to the position T.

38. The system for tracking positions of human extremities as claimed in claim 21, wherein the geometry relations comprise increasing probability of updating a first extremity position of the first extremity portion by the outline candidate position when difference between coordinates of the outline candidate position residing in a specific axis and that of the second extremity position of the second extremity portion residing in the specific axis is greater, or decreasing the probability when less.

39. The system for tracking positions of human extremities as claimed in claim 21, wherein the geometry relations comprise increasing probability of updating a first extremity position of the first extremity portion by the depth candidate position when difference between coordinates of the depth candidate position residing in a specific axis and that of the second extremity position of the second extremity portion residing in the specific axis is less, or decreasing the probability when greater.

40. The system for tracking positions of human extremities as claimed in claim 21, wherein the operation device determines whether a first extremity position of the first extremity portion is replaced by the outline candidate position or the depth candidate position.

* * * * *